US009051945B2

(12) United States Patent
Hague

(10) Patent No.: US 9,051,945 B2
(45) Date of Patent: Jun. 9, 2015

(54) SYSTEM AND METHOD FOR IDENTIFYING IMPENDING HYDRAULIC PUMP FAILURE

(75) Inventor: M. Evan Hague, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 625 days.

(21) Appl. No.: 13/460,082

(22) Filed: Apr. 30, 2012

(65) Prior Publication Data

US 2013/0283773 A1 Oct. 31, 2013

(51) Int. Cl.

| | |
|---|---|
| ***F16D 31/02*** | (2006.01) |
| ***F15B 19/00*** | (2006.01) |
| ***F04B 49/10*** | (2006.01) |
| ***F04B 51/00*** | (2006.01) |
| ***E02F 9/22*** | (2006.01) |
| ***E02F 9/26*** | (2006.01) |

(52) U.S. Cl.

CPC ............. *F15B 19/005* (2013.01); *F04B 49/106* (2013.01); *F04B 51/00* (2013.01); *F15B 2211/20546* (2013.01); *F15B 2211/20576* (2013.01); *F15B 2211/6306* (2013.01); *F15B 2211/633* (2013.01); *F15B 2211/6336* (2013.01); *F15B 2211/6652* (2013.01); *F15B 2211/855* (2013.01); *E02F 9/2292* (2013.01); *E02F 9/267* (2013.01)

(58) Field of Classification Search

CPC ...... F15B 11/17; F15B 19/005; F15B 49/106; F15B 51/00

USPC .................................................... 60/403, 405

See application file for complete search history.

(56) References Cited

U.S. PATENT DOCUMENTS

| | | | | |
|---|---|---|---|---|
| 5,063,775 | A | 11/1991 | Walker, Sr. et al. | |
| 5,720,598 | A * | 2/1998 | de Chizzelle | 417/53 |
| 6,256,594 | B1 | 7/2001 | Yamamoto et al. | |
| 6,619,111 | B2 | 9/2003 | Soneda et al. | |
| 6,829,542 | B1 | 12/2004 | Reynolds et al. | |
| 6,882,960 | B2 | 4/2005 | Miller | |
| 7,204,138 | B2 | 4/2007 | Du | |
| 7,542,875 | B2 * | 6/2009 | Rogers | 702/183 |
| 7,623,986 | B2 | 11/2009 | Miller | |
| 7,913,496 | B2 | 3/2011 | Batenburg et al. | |
| 7,970,558 | B1 | 6/2011 | Roys | |
| 2003/0144818 | A1 * | 7/2003 | Kasuya et al. | 702/185 |
| 2012/0150383 | A1 * | 6/2012 | Douglas | 701/30.5 |
| 2013/0204546 | A1 * | 8/2013 | Devine et al. | 702/45 |

* cited by examiner

*Primary Examiner* — Edward Look
*Assistant Examiner* — Daniel Collins
(74) *Attorney, Agent, or Firm* — Miller, Matthias & Hull LLP

(57) ABSTRACT

A system and method for predicting impending pump failure in a hydraulic system is disclosed. The system measures and compares the running and moving volumetric deficiencies of the hydraulic system as a whole and if they are not within range of each other by a predetermined threshold, the system determines that at least one of the pumps in the system is about to fail. If such a determination is made by the system, the pump displacement is at standby of each pump is then calculated and the pump with the greatest displacement at standby is determined to be the pump approaching failure. Once the pump approaching failure is identified, a signal is generated to apprise the operator or other entity to enable corrective action to be taken.

20 Claims, 3 Drawing Sheets

SYSTEM AND METHOD FOR IDENTIFYING IMPENDING HYDRAULIC PUMP FAILURE

TECHNICAL FIELD

The present disclosure generally relates to hydraulic systems and, more particularly, relates to diagnostic monitoring systems for identifying impending pump failures in hydraulic systems.

BACKGROUND

Hydraulic systems are widely used to perform useful work. Common applications are found on earth-moving and mining machines which use hydraulic systems to move various work tools. For example, on a wheeled or track-type loader, the hydraulic system may be used to raise and lower the arms of the loader as well as tilt a bucket or other work tool attached to the end of the movable arms. In such a system, an engine, typically a diesel engine, is mounted on a chassis and connected by way of a drivetrain to a plurality of wheels or continuous tracks to provide locomotion to the machine. The engine also is used to drive one or more hydraulic pumps to maintain pressure within the hydraulic system of the machine. The one or more pumps are in turn connected to one or more valves which then distribute the hydraulic fluid to one or more hydraulic cylinders movably mounted on the machine. The opposite ends of each cylinder are then connected to a movable arm or work tool as indicated above.

While effective, and used pervasively throughout the industrial world, it can be seen that such hydraulic systems are heavily dependent on proper operation of the engine and pumps. With specific reference to the pumps, if any one of the pumps were to fail, the pressure within the system would also fail and the ability of the machine to perform its designated tasks or work function would also fail. In a construction or mining operation this is simply unacceptable. Any amount of downtime, i.e. time during which the machine is not operational, is lost workflow to the owner of the machine, and thus lost profit.

The pump failure can manifest itself in any number of ways including catastrophic or explosive or more prolonged or incremental. With the former, of course this is hazardous to the operator and those around the machine and immediately results in a non-operational machine. As such machines are often operated in very remote locales, the downtime is also often of a significant duration. Not only must parts be brought in to the work site, but a service technician knowledgeable in the repair of the machine must also be brought in to perform the repair. In even worse situations, the machine has to be transported to a repair facility.

The more incremental type of failure can also be extremely costly to the owner of the machine. If the pump were to more slowly deteriorate or fail, parts or particles from the pump can be released into the hydraulic fluid which will then be disseminated through the hydraulic system. This can clog or damage any of the aforementioned components including the valves or hydraulic cylinders as mentioned above, the components of the individual work tools, the hoses, the couplings, or any other component associated with the hydraulic system. These then also need to be replaced or repaired at significant expense and downtime, or at the very least, the entire hydraulic system must be drained to ensure that such particles and particulates do not remain in the system which then results in significant downtime and added labor cost.

Even if a pump failure has not yet taken place, the decreased efficiency with which the pump is operating also results in less output flow and lower profits. If the pump is not performing as it had been designed, the power of the system is necessarily decreased, the engine is required to work harder for less return, fuel consumption increases, maintenance costs increase, and overall productivity decreases.

In light of the foregoing, it can be seen that a need exists for a system and method by which failure of a pump can be predicted ahead of time so as to avoid outright failure and the associated downside indicated above.

SUMMARY OF THE DISCLOSURE

In accordance with one aspect of the disclosure, a method of determining impending hydraulic pump failure in a multiple pump hydraulic system is therefore disclosed. The method may include measuring volumetric deficiency of the hydraulic system, determining that one of the multiple pumps in the system is approaching failure when the volumetric deficiency is decreasing at a rate greater than a predetermined threshold, measuring pump displacement at standby for first and second pumps when its determined that one of the pumps is approaching failure, determining which one of the first and second pumps is approaching failure when the measured pump displacement at standby of one of the pumps is greater than the pump displacement at standby of the other pump by a predetermined range, and generating a signal indicative of impending failure of the pump with the greater pump displacement at standby.

In accordance with another aspect of the disclosure, a hydraulic system is disclosed which may comprise at least two pumps, at least two hydraulic cylinders, at least one valve between the at least two pumps and at least two hydraulic cylinders, at least one hydraulically actuated tool operatively connected to each hydraulic cylinder, a displacement sensor associated with each hydraulic cylinder, a speed sensor associated with each pump, a pressure sensor associated with at least one valve, and a processor. The processor may receive signals from each sensor, calculate volumetric deficiency over time, determine if pump failure is impending when the volumetric deficiency is decreasing at a rate greater than a predetermined threshold, calculate pump displacement at standby for the at least two pumps, determine if one of the pump displacements at standby is greater than the other by a predetermined range, and generate a signal indicating an impending pump failure for the pump with the greater pump displacement at standby.

In accordance with another aspect of the disclosure, a machine is disclosed which may comprise a chassis, a drive train movably supporting the chassis, an engine supported by the chassis and operatively connected to the drive train, an operator cabin supported by the chassis, at least two hydraulic pumps supported by the chassis, at least two hydraulic cylinders extending from the chassis and operatively connected to the hydraulic pumps, at least one valve between the at least two pumps and the at least two hydraulic cylinders, at least one hydraulically actuated tool operatively connected to each hydraulic cylinder, a speed sensor associated with each pump, a pressure sensor associated with the at least one valve, a processor receiving signals from each sensor, calculating volumetric efficiency over time, determining a pump failure is impending when the volumetric efficiency is decreasing at a rate greater than a predetermined threshold, calculating pump displacement at standby for the at least two pumps, determining if one of the pump displacements at standby is greater than the other by a predetermined range, and generating a signal indicating an impending pump failure for the pump with the greater pump displacement at standby, and an operator interface in the operator cabin adapted to receive the impending failure signal and display indicia indicative of same.

These and other aspects and features of the disclosure will become more apparent upon reading the following detailed description when taken in conjunction with the accompanying drawings.

While of the following detailed description will be given with respect to certain specific embodiments, it is to be understood that the scope of the disclosure should not be limited to such embodiments, but that the same are provided simply for enablement and best mode purposes. The breath and spirit of the present disclosure is broader than the embodiments specifically disclosed herein and encompassed within the claims appended hereto.

DETAILED DESCRIPTION

Figure 1:
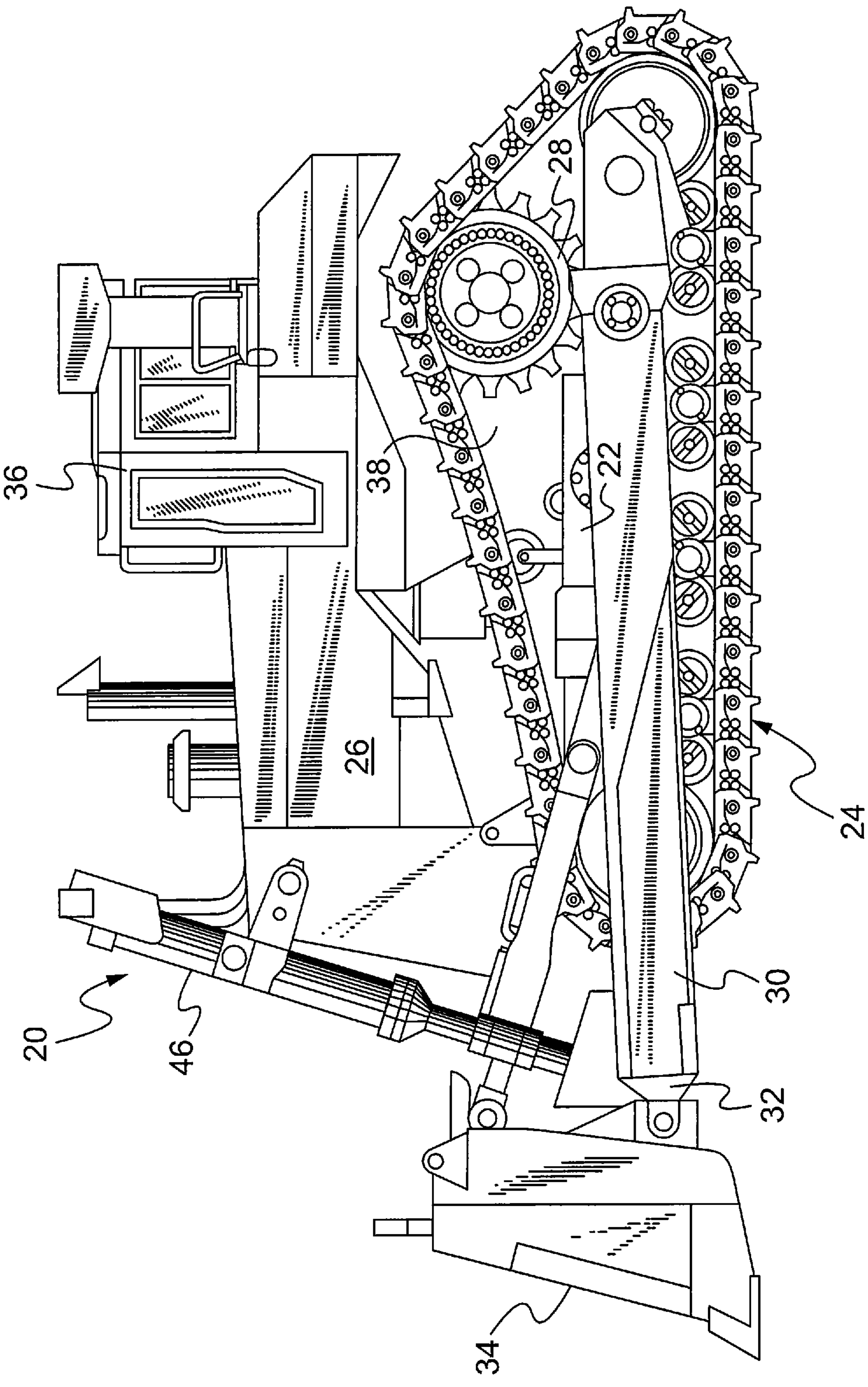
FIG. 1 is a perspective view of a machine employing a hydraulic system constructed in accordance with the teachings of the disclosure.

Referring now to FIG. 1, a machine constructed in accordance with the teachings of the disclosure is generally referred to be reference numeral 20. While machine 20 depicted in FIG. 1 is that of a track type tractor, it is to be understood that the teachings of this disclosure can be used on any machine using hydraulics including, but not limited, to various construction, agricultural, mining, and other earth-moving operations. Such machines may include, but not be limited to, loaders, excavators, trucks, pipe layers, graders, harvesters, lift trucks, paving machines, and the like, all of which may be wheeled or driven by tracks.

As shown therein, the machine 20 may include a chassis 22 which is supported for motion by way of wheels, or in the case of FIG. 1, a continuous track 24. Chassis 22 also supports an engine 26 connected by way of drivetrain 28 to the aforementioned wheels or track 24. Extending from the chassis 22 may be one or more work arms 30 to a distal end 32 of which may be attached one or more work tools 34. An operator cabin 36 is supported by the chassis 22 for allowing an operator (not shown) to control the machine 20.

Figure 2:
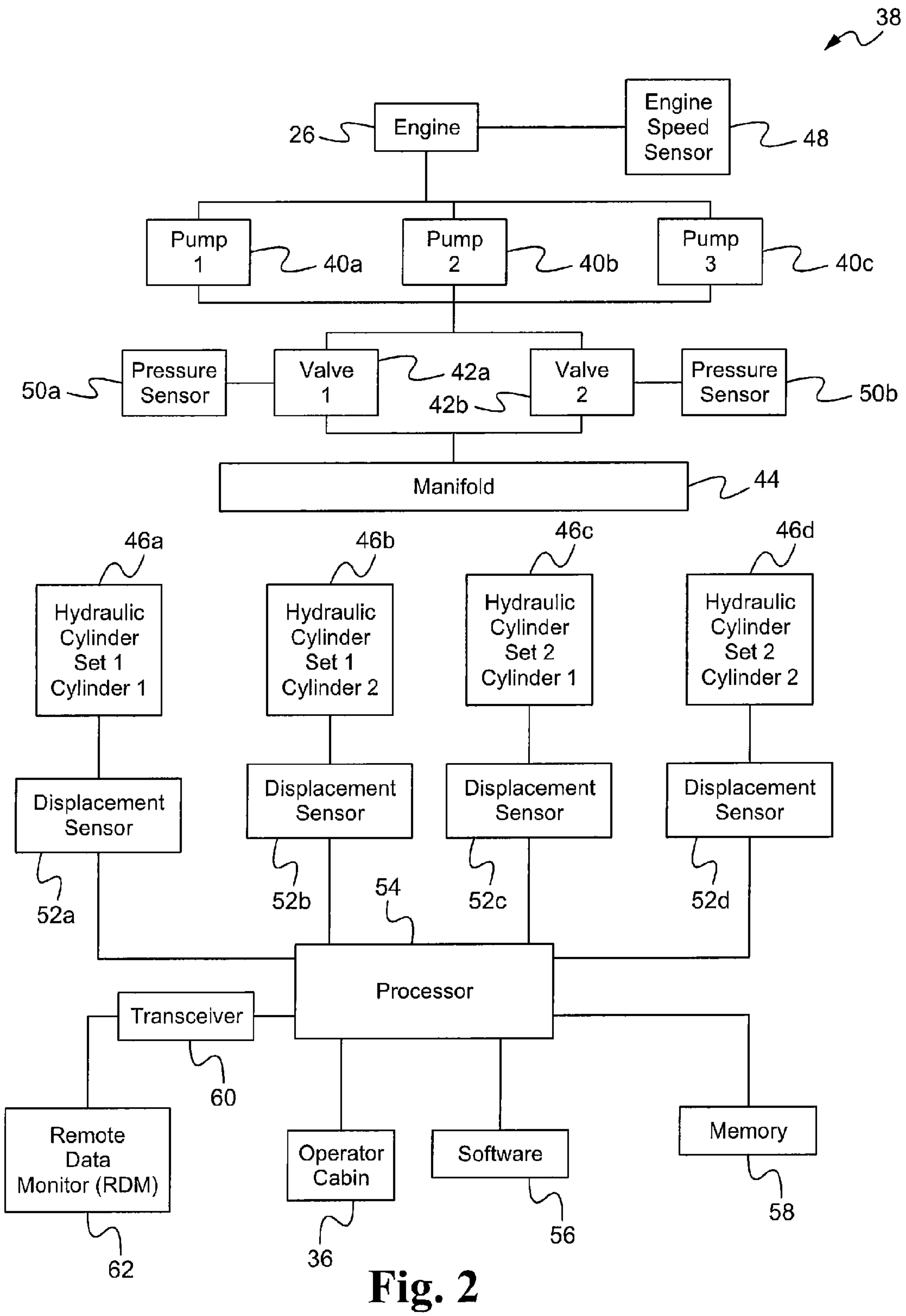
FIG. 2 is a hydraulic schematic representing the components of the hydraulic system and impending failure notification system.

In order for the work arms 30 and work tools 34 to move, a hydraulic system 38, as broadly shown in FIG. 1 and more specifically shown in FIG. 2, is provided. To pressurize the hydraulic system 38, one or more pumps 40 may be operatively connected to the engine 26 and mounted within the machine 20. As shown in FIG. 2, first, second, and third pumps 40*a*, 40*b*, and 40*c* may be provided, but it is to be understood that the hydraulic system 38 may include a lesser number of pumps such as two, or a number of pumps greater than three. The pumps 40 are in turn connected to a plurality of valves 42 to control the flow of the fluid out of each of the pumps 40, with the flow out of the valves 42 being combined into a manifold 44 before being disseminated to the plurality of hydraulic cylinders 46. As the hydraulic cylinders 46 telescopingly expand and contract, the work arms 30 or work tools 34 to which they are attached move accordingly. Again as indicated in FIG. 2, four individual hydraulic cylinders 46*a*, 46*b*, 46*c*, and 46*d* are depicted, but it is to be understood that the present disclosure can incorporate a greater or lesser number of cylinders as well.

In order to monitor certain parameters associated with each of the aforementioned components, such machines 20 are typically provided with a plurality of sensors. Such sensors could include an engine speed sensor 48, pressure sensors 50 associated with each pump or valve, and displacement sensors 52 associated with each hydraulic cylinder 46. In addition, while not shown, a speed sensor could be associated with each individual pump 40, but typically by way of a pump drive ratio, pump speed can be calculated from engine speed.

The foregoing components are typical of those provided on conventional earth-moving, mining, and construction machines currently on the market. However, such machines currently do not provide a mechanism or method for predicting when one of the aforementioned pumps is about to fail. In this regard, the present disclosure drastically diverges from the prior art by providing a processor 54 and software 56 to enable such diagnostics to take place. More specifically, it will be noted that each of the aforementioned sensors 48, 50, and 52 is in communication with the processor 54. The data received from those sensors can be stored on an onboard memory 58 or by way of a transceiver 60 be wirelessly communicated to a remote data monitor (RDM) 62. For example, the machine 20 may be one of a plurality of machines in an overall fleet with the owner of the fleet maintaining a centralized operational hub on the work site, or many miles away in a remote monitoring facility. Alternatively, or in addition to, the manufacturer of the machine 20 may also maintain a remote data monitor to receive such information and work cooperatively with the owner of the machines to apprise them of any impending issues. In addition, the processor 54 may be in communication with the operator cabin 36 and therewithin may include some form of indicia such as a meter, siren, alarm, or the like (not shown) to indicate to the operator when a pump failure is impending. The operator can then take corrective action such as manually shutting down the machine 20, calling for service assistance, decreasing workload, or some combination thereof. Moreover, by wirelessly transmitting the information gathered by the sensors to the remote data monitor, a redundant monitoring system is thereby created where not only is the operator responsible, but another entity is as well which can then notify the operator, the owner of the fleet, or a service technician for immediate dispatch.

Figure 3:
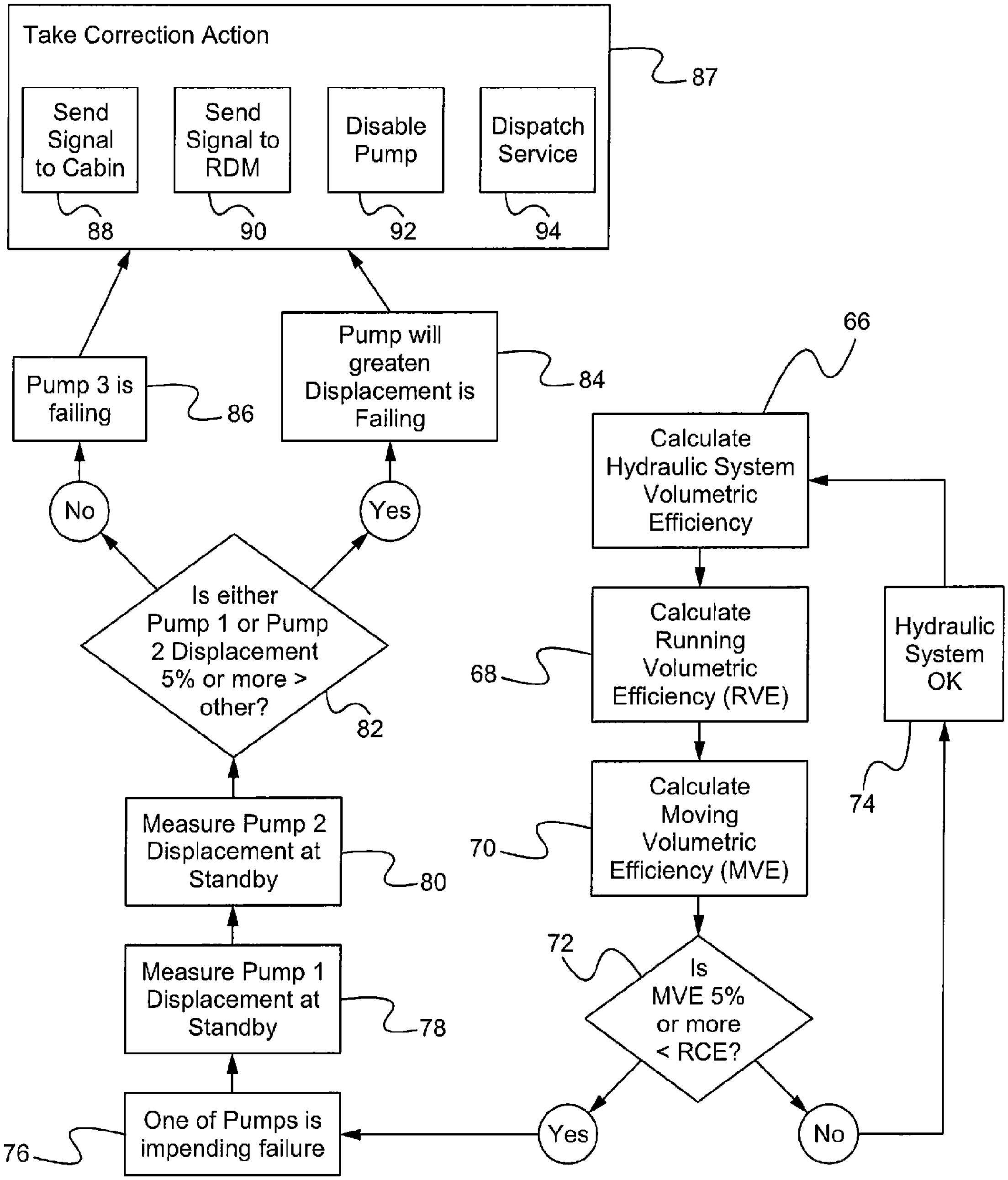
FIG. 3 is a flow chart depicting a sample sequence of steps which may be practiced in accordance with the method of the pending disclosure.

Referring now to FIG. 3, a sample sequence of steps which may be conducted in accordance with the method of the pending disclosure is shown in flow chart format. Starting with step 66, a first step practiced by the present disclosure may be to calculate the overall volumetric efficiency of the hydraulic system 38. This can be done in any number of different ways and in accordance with known formulae.

However, by using the sensors preexisting on the machine 20, the software 56 of the pending present disclosure is able to accurately calculate the volumetric efficiency without any additional hardware being necessarily mounted on the machine 20. More specifically, the software takes the derivative of the hydraulic cylinder displacement, as measured by sensor 52, to first calculate the hydraulic cylinder velocity. As the hydraulic cylinder geometry is also known, the hydraulic system output flow can therefore be calculated. In concurrence with this calculation, the commanded pump displacements and the pump speed calculated from the engine speed, is then used to calculate theoretical pump flow. When the pumps are commanded to maximum displacement and the valve pressure, taken from sensor 50, is in a working range but less than a relief pressure, the average of the two flows is taken and an overall volumetric efficiency is calculated.

From this, as shown in steps 68 and 70, the running volumetric efficiency and the moving volumetric efficiency can then be calculated. As defined herein, the "running volumetric efficiency" is the expected volumetric efficiency for the pump over its lifetime. This may take into account the specific nuances of every particular pump being manufactured as well as the overall expectations of such a pump design. On the other hand, the "moving volumetric efficiency" is defined as the actual or initial volumetric efficiency in real time, or over the course of a much shorter time duration such as a few seconds or the like. From these two calculated variables, referred to herein as RVE and MVE, respectfully, a comparison is made as shown in step 72. If the MVE is greater than the RVE by a predetermined threshold, the software 56 determines that at least one of the pumps 40 of the system 38 is not performing at its desired. Here, the inventors have found that that predetermined threshold can be set at a 5% differential, but other predetermined thresholds depending on the specific pump design of course can also be employed. If, on the other hand, the software 56 determines that the MVE is within 5% of the RVE, the software will conclude that the hydraulic system 38 is operating correctly as indicated by step 74, whereupon the logic reverts to the calculation of the hydraulic system volumetric efficiency as indicated by step 66. This analysis is continually monitored and calculated by the processor 54 throughout the operation of the machine 20.

In the event that step 72 concludes that one or more of the pumps 40 is not operating as desired as indicated by step 76, a number of subsequent steps are undertaken to determine which pump 40 is failing or about to fail. Starting with the step 78, the software 56 calculates the displacement of the first pump 40*a* at standby. "At standby" is defined herein as an operating condition of machine 20 when it is not performing work. Accordingly, the timing of this particular calculation is dependent upon the actual actions of the operator. For example, after an operator makes a pass or dumps a load, and the system senses that the pumps are not being commanded to work for a predetermined length of time, the system is determined to be "at standby" whereupon the pump displacement can be measured. When at standby, in a three pump system, two of the pumps will then be commanded to maintain sufficient pressure through a closed loop command. It is in that condition that the displacement of pump 40*a* will be calculated. In a step 80, the displacement of the second pump 40*b* is similarly calculated. Once the displacement at standby of pump 40*a* and 40*b* are calculated, a comparison of the calculated values is then undertaken in a step 82. More specifically, the software 56 compares the calculated pump displacement of the first pump 40*a* to the calculated pump displacement of the second pump 40*b* and if the first is greater than the second by a predetermined range, the software 56 determines that the first pump is the one approaching failure. Similar to the predetermined threshold referenced with respect to volumetric efficiency, the predetermined range associated with pump displacement can be variable dependent upon the specific application. However, the inventors have found that a predetermined range of 5% serves as an accurate diagnostic tool. Other percentages are certainly possible. Referring back to FIG. 3, this step is illustrated by reference numeral 84.

In the alternative, if the software 56 determines that the differential between the pump displacements of the first and second pumps 40*a* and 40*b* at standby are less than the predetermined range, in a three pump system, the software 56 concludes that the third pump 40*c* is in fact the pump approaching failure as indicated in step 86. Of course in systems employing a lesser or greater number of pumps, the steps can be iterative and be conducted the appropriate number of times.

After any specific pump 40*a*, 40*b*, or 40*c* is determined to be impending failure, a number of corrective actions 82 can be taken such as sending signals to the operator cabin as indicated by step 88, sending signals to the remote data monitor as indicated by step 90, disabling the identified pump as indicated by step 92, or immediately dispatching service as indicated by step 94. Regardless of the corrective measure taken, the software 56 will have predicted the impending pump failure and prevented the actual pump failure from occurring.

INDUSTRIAL APPLICABILITY

In general, the teachings of the pending disclosure can find applicability in any number of different industries including but not limited to, agricultural, construction, earth-moving, and mining operations employing machines with hydraulic systems. The system and method provide an accurate tool by which impending pump failure can be predicted and by which the pump can be disabled prior to such costly failure. Moreover, by using the existing structure and sensors already provided on-board such machines, existing machines can be retrofit with such a diagnostic tool, or original machines can be manufactured at a minimum expense. It is also important to note that the aforementioned diagnostic software broadly employs two steps for determining which pump is about to fail. As indicated above, it first calculates the volumetric deficiencies and determines if they are within a predetermined differential of one another. It then determines by way of pump displacement at standby which specific pump is about to fail. Of course, the teachings of the disclosure can be employed in opposite order whereby the pump displacement is first calculated and then the volumetric deficiencies are used to determine which specific pump is about to fail.

While only certain embodiments have been set forth, alternatives and modifications will be apparent from the foregoing description to those skilled in the art. These and other alternatives are considered equivalent within the spirit and scope of this disclosure and the appending claims.

What is claimed is:

1. A method of determining impending pump failure in a multiple pump hydraulic system, comprising;

measuring volumetric efficiency of the hydraulic system;

determining that one of the multiple pumps is approaching failure when the volumetric efficiency is decreasing at a rate greater than a predetermined threshold;

measuring pump displacement at standby for first and second pumps when it is determined that one of the pumps is approaching failure;

determining which one of the first and second pumps is approaching failure when the measured pump displacement at standby of one of the pumps is greater than the pump displacement at standby for the other pump by a predetermined range; and generating a signal indicating an impending failure of the pump with the greater pump displacement at standby.

2. The method of claim 1, wherein the predetermined threshold is 5%.

3. The method of claim 1, wherein the predetermined range is 5%.

4. The method of claim 1, further including determining that a third pump is approaching failure when neither the measured pump displacement of the first pump nor the measured pump displacement of the second pump is greater than the other by the predetermined range.

5. The method of claim 1, further including disabling the pump determined to be impending failure.

6. The method of claim 1, wherein the measuring steps are performed using existing sensors in the hydraulic system.

7. The method of claim 6, wherein the sensors sense engine speed, pressure and hydraulic cylinder displacement.

8. The method of claim 1, wherein the volumetric efficiency is measured at full flow and maximum pressure.

9. The method of claim 8, further including calculating running volumetric efficiency and moving volumetric efficiency and the determining that one of the multiple pumps is approaching failure step is performed when the moving volumetric efficiency is 5% less than the running volumetric efficiency.

10. The method of claim 8, wherein the hydraulic cylinder displacement is used to determine system flow.

11. The method of claim 8, wherein commanded pump displacement is assumed as actual pump displacement in calculating theoretical maximum pump flow.

12. A hydraulic system, comprising:

at least two pumps;

at least two hydraulic cylinders;

at least one valve between the at least two pumps and at least two hydraulic cylinders;

at least one hydraulically actuated tool operatively connected to each hydraulic cylinder;

a displacement sensor associated with each hydraulic cylinder;

a speed sensor associated with each pump;

a pressure sensor associated with the at least one valve; and a processor receiving signals from each sensor, calculating volumetric efficiency over time, determining a pump failure is impending when the volumetric efficiency is decreasing at a rate greater than a predetermined threshold, calculating pump displacement at standby for the at least two pumps, determining if one of the pump displacements at standby is greater than the other by a predetermined range, and generating a signal indicating an impending pump failure for the pump with the greater pump displacement at standby.

13. The hydraulic system of claim 12, wherein the predetermined threshold is 5%.

14. The hydraulic system of claim 12, wherein the predetermined range is 5%.

15. The hydraulic system of claim 12 further including a threshold pump and the processor determines which pump is approaching failure by comparing pump displacement at standby for a first pump to pump displacement at standby for a second pump, and if the pump displacements are within the predetermined range of one another, determining that the third pump is impending failure.

16. The hydraulic system of claim 12, wherein the processor further calculates running volumetric efficiency and moving volumetric efficiency and determines that one of the pumps is impending failure when the moving volumetric efficiency is 5% less than the running volumetric efficiency.

17. A machine, comprising:

a chassis;

a drivetrain movably supporting the chassis;

an engine supported by the chassis and operatively connected to the drive train;

an operator cabin supported by the chassis;

at least two hydraulic pumps supported by the chassis;

at least two hydraulic cylinders extending from the chassis and operatively connected to the hydraulic pumps;

at least one valve between the at least two pumps and the at least two hydraulic cylinders;

at least one hydraulically actuated tool operatively connected to each hydraulic cylinder;

a speed sensor associated with each pump;

a pressure sensor associated with the at least one valve;

a processor receiving signals from each sensor calculating volumetric efficiency over time, determining pump failure is impending when the volumetric efficiency is decreasing at a rate greater than a predetermined threshold, calculating pump displacement at standby for the at least two pumps, determining if one of the pump displacements at standby is greater than the other by a predetermined range, and generating a signal indicating an impending pump failure for the pump with the greater pump displacement at standby; and an operator interface in the operator cabin adapted to receive the impending failure signal and display indicia indicative of same.

18. The machine of claim 17, wherein the machine is an earth-moving machine.

19. The machine of claim 17, further including a remote processor provided apart from the machine and adapted to receive signals from the sensor, determining the pump with impending failure, and transmit a signal indicating same to the operator cabin.

20. The machine of claim 17, wherein the machine includes at least three pumps and the processor determines which pump is approaching failure by comparing pump displacement at standby for a first pump to a second pump and if the pump displacements are within the predetermined range of one another, determining that the third pump is impending failure.

* * * * *